Patented Dec. 15, 1953

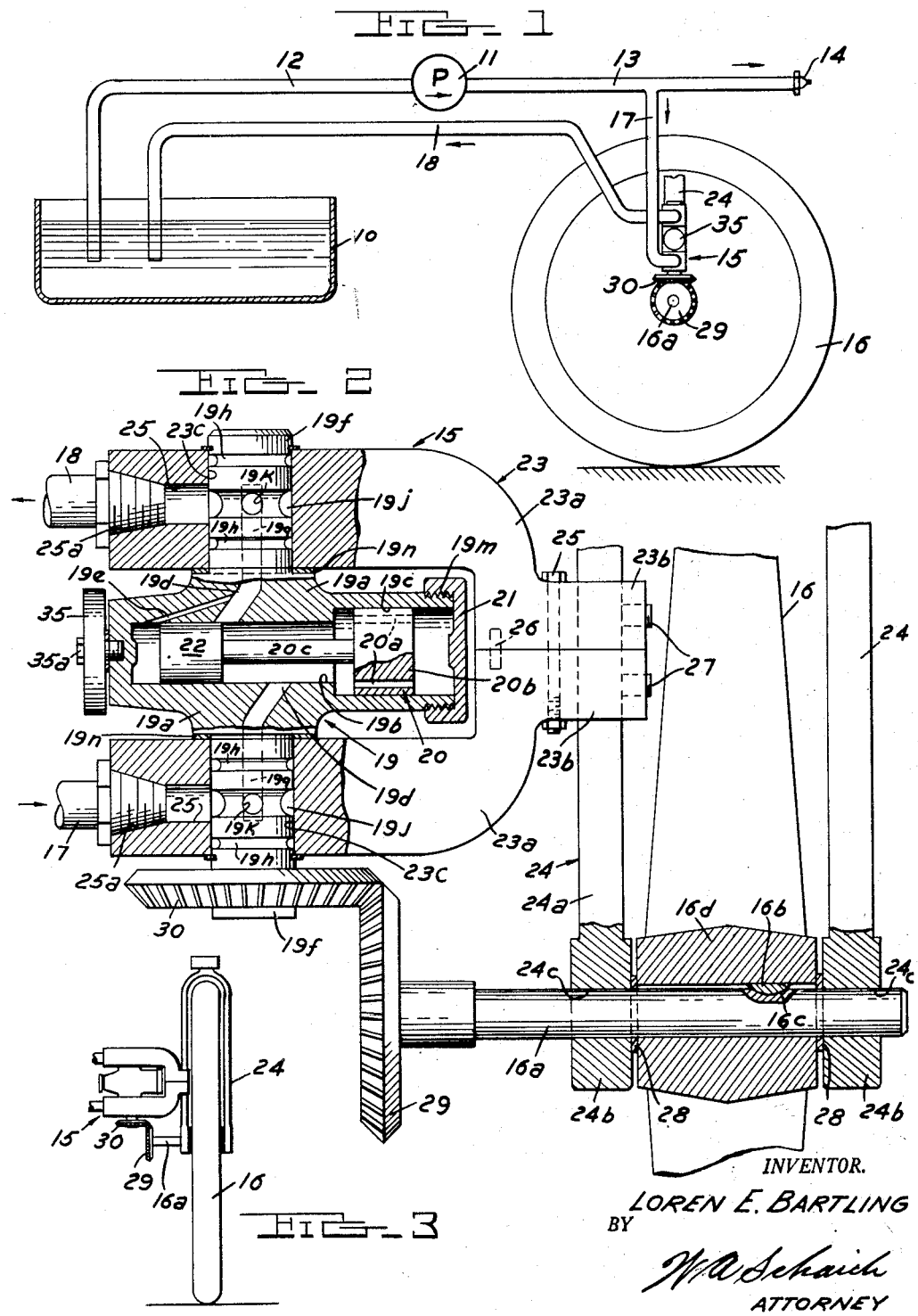

2,662,795

UNITED STATES PATENT OFFICE 2,662,795

GOVERNOR FOR SPRAYERS

Loren E. Bartling, Detroit, Mich., assignor to Dearborn Motors Corporation, Highland Park, Mich., a corporation of Delaware Application August 3, 1950, Serial No. 177,511

3 Claims. (Cl. 299—46)

This invention relates to a method and apparatus for maintaining a uniform rate of application of spray liquid per unit of area covered irrespective of varying ground speeds of the sprayer.

In crop spraying, particularly when spraying large acreages of crops with insecticides or weed control sprays, it is virtually impossible to maintain a constant tractor speed for any length of time due to various factors, such as terrain and soil firmness. Obviously if the sprayer is adjusted to deliver a certain amount of spray fluid per unit of area for a given rate of tractor speed, the rate of application will be varied with any change in rate of speed of the tractor. It follows, therefor, that an even discharge rate of the spray fluid with variable tractor speeds will result in non-uniform coverage of the crop.

Accordingly, it is an object of this invention to provide an improved method and apparatus for controlling the spray pressure of a sprayer for delivering a constant amount of spray fluid per unit of area traversed, irrespective of varying ground speeds of the sprayer.

Another object of this invention is to provide an improved spray control governor for varying the discharge pressure of a sprayer in relation to the ground speed of the sprayer for delivery of a constant rate of spray fluid per unit of area.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Fig. 1 is a schematic view showing the general arrangement of the fluid delivery system of a sprayer operating according to the method of this invention.

Fig. 2 is an enlarged detail view partly in section of the spray governor embodying this invention and the ground wheel drive mechanism for rotating the governor.

Fig. 3 is a reduced scale front end view of the ground wheel and governor mounted thereon.

As shown on the drawings:

Briefly this invention contemplates the control of the quantity of fluid discharged by a spraying system as a function of the ground speed. To carry out this method, this invention also provides an improved hydraulic governor consisting of a weighted by-pass valve contained within a housing and such housing is rotated by a ground wheel actuated drive mechanism. The centrifugal forces on the revolving valve are balanced by a hydraulic force proportional to the outlet pressure from the spray pump. The governor then increases or decreases the spray discharge pressure in accordance with an increase or decrease in the ground speed of the sprayer, thereby regulating the rate of spray discharge in accordance with the speed of the tractor to provide a constant application of spray per unit of area.

In Fig. 1 there is shown schematically a sprayer fluid delivery system operating in accordance with the method of this invention and with which the improved spray governor of this invention may be utilized. A tank 10 containing the spray fluid is provided and a pump 11 is utilized to furnish pressured fluid to the spray boom 14. A conduit 12 connects the intake side of pump 11 with tank 10. The output side of the pump 11 is connected by a conduit 13 to a spray boom or nozzle 14. A governor, indicated generally by the numeral 15, is provided for varying the pressure of the spray fluid delivered to the spray boom 14 as a function of the ground speed and is shown mounted adjacent a ground driven wheel 16. Governor 15 is connected to conduit 13 by bypass conduit 17 and a conduit 18 returns fluid to tank 10 by-passed by such governor.

Governor 15, shown in detail in Fig. 2, comprises a yoke shaped bracket or housing 23 formed of two identical half parts 23a which are joinable on a horizontal plane. Yoke portions 23a are secured together in assembled relationship by a vertical bolt 25 inserted in suitable vertically disposed holes provided in the stem portions 23b of the yoke halves. A vertical dowel pin 26 may also be utilized to prevent sideways displacement of the members 23a. Stem portions 23b are also vertically apertured to receive a supporting arm 24 to which the governor 15 is secured by set screws 27.

Vertically aligned bores 23c are respectively provided in the yoke arm extremities of yoke halves 23a and rotatably support opposed stub shafts 19f of a valve housing 19. Thrust washers 19n surrounding such stub shafts lie respectively adjacent the inside faces of yoke portions 23a and bosses 19a in bearing relationship therewith as shown in Fig. 2. Horizontal bores 25 are respectively provided in the upper and lower portions 23a of yoke 23 communicating with vertical bores 23c. Recesses 25 are counterbored and threaded as shown at 25a to respectively receive conduits 17 and 18. Pressured fluid is introduced to the governor through conduit 17, and conduit 18 bypasses the unused portion of the pressured fluid to the supply tank 10.

Valve housing 19 is of generally cylindrical, cruciform configuration having opposed bosses 19a terminating in the mounting shaft portions 19f. An axial recess 19b is provided in housing 19 at right angles to the axis of shaft portions 19f and such recess is counterbored as shown at 19c to slidably receive a cylindrical weight member 20 having a head portion 20b and an axial stem portion 20c. Weight 20 is provided with a pair of longitudinally extending passageways 20a in its head portion for a purpose to be later explained. The right hand end (Fig. 2) of body 19 is exteriorly threaded as shown at 19m and a cap 21 is screwed on to such threaded end to seal counterbore 19c. The length of head portion 20a of weight 20 is substantially less than the length of counterbore 19c to permit longitudinal movement of such weight therein as will be later described. Parallel inclined fluid passageways 19d are provided in each cylindrical boss 19a which communicate with axial recess 19b at axially spaced points.

A cylindrical piston like valve portion 22 is integrally formed on the end of stem portion 20c of the weight 20 and such valve portion normally partially seals off the passageway 19d provided in the upper boss 19a in accordance with the axial position of weight 20. For reference convenience the weight 20 and valve portion 22 will hereinafter be referred to as the weighted valve. Spray fluid is bled to the left hand end of valve 22 as shown in Fig. 2 by a passageway 19e connecting the upper passageway 19d with the extreme left hand end of axial recess 19b.

As previously mentioned, bosses 19a respectively have axial stub shafts 19f suitably formed thereon and such shafts are each provided with an axial recess 19g which communicates with the adjacent inclined passageway 19d. Each stub shaft 19f has a pair of axially spaced annular fluid sealing grooves 19h formed thereon and a third larger annular groove 19j is disposed between each pair of grooves 19h. A transverse hole 19k connects each groove 19j with the adjacent recess 19g. Annular groove 19j in turn communicates with the adjacent recess 25 in the yoke arm. A counter-balancing weight member 35 is longitudinally adjustably secured to the left end of valve housing 19 by an axially disposed screw 35a which is utilized for dynamic balancing of valve housing 19.

Governor 15 is mounted on a suitable support arm 24a, which may conveniently be the left hand tine of a wheel fork 24. A ground engaging wheel 16 is mounted between the tines of fork 24 on a shaft 16a which is rotatably supported in aligned, transverse hub portions 24b provided on the bottom ends of each tine of fork 24. A transverse hole 24c is provided in each hub portion 24b to rotatably support shaft 16a. Ground wheel 16 is non-rotatably secured to shaft 16a as by a key 16b cooperating with a keyway 16c provided in the hub portion 16d of ground wheel 16. Washers 28 are provided between the wheel hub ends 16d and the fork hubs 24b. On the left hand end of shaft 16a, as shown in Fig. 2, there is non-rotatably secured a bevel gear 29 and such gear cooperates with a second bevel gear 30 secured to the end of the shaft portion 19f of valve housing 19 projecting below the yoke 23. The upper end of fork 24 is suitably secured to the frame of the sprayer (not shown). It is of course, obvious that the above described drive is only one specific arrangement of many well known types of drives that may be utilized to rotate governor 15. It is only necessary that valve housing 19 be rotated at a speed proportional to ground travel of the spraying device.

*Operation*

Pressured fluid is delivered from pump 11 to boom 14, but a portion thereof is diverted to governor 15 through conduit 17. The diverted fluid enters yoke recess 25, then valve housing recess 19d, thence through bleed passage 19e and holes 20a in weight 20 to fill the interior of the valve housing.

From the foregoing description it will be apparent that the longitudinal holes 20a in the weight portion 20 of the weighted valve effectively permit the same hydraulic fluid pressure to be applied to the end area of the weight portion 20 as exists in the chamber surrounding the stem portion 20c. The hydraulic pressure in the chamber surrounding the stem portion 20c is, of course, the same as in inlet conduit 17 and is determined by the discharge pressure of the pump 11. At the same time, the fluid pressure in the chamber defined beyond the left end of the valve portion 22, as viewed in Fig. 2, is determined by the pressure existing in the inclined passage 19d through the operation of the bleed connection 19e, hence the same as the pressure in outlet conduit 18. It is also apparent that of all of the radial areas of the weighted valve exposed in the inlet fluid pressure, there is an excess of radial area so exposed tending to produce a displacement of the weighted valve to the left, as viewed in Fig. 2, and such unbalanced area is exactly equal to the area of the left end radial face of the valve portion 22. At any time that the valve portion 22 partially overlies the port opening of the passage 19d, the fluid pressure in the passage 19d will necessarily be somewhat less than the fluid pressure in the chamber surrounding stem portion 20c. Accordingly, there will be a net fluid force on the weighted valve tending to move it to the left, as viewed in Fig. 2, and thus to fully uncover the port opening of the passage 19d.

When the spraying unit is traversed over the ground, the rotation of the ground engaging wheel 16 produces a rotation of the valve housing 19 and therefore, since the weight portion 20 of the weighted valve has greater mass than the valve portion 22, a centrifugally produced force is exerted on the weighted valve tending to move it toward the right, as viewed in Fig. 2, hence in opposition to the unbalanced fluid pressure forces which are produced whenever the valve portion 22 partially overlies the opening of the inclined passage 19d. Hence, at any ground speed at which the sprayer is operated, the weighted valve will assume an equilibrium position within the valve housing 19 wherein a sufficient pressure difference is produced between the inlet side of the centrifugal valve, represented by the conduit 17, and the outlet side of the centrifugal valve, represented by the conduit 18, to balance the centrifugal forces acting on the weighted valve. Accordingly, as the ground speed of the sprayer increases, the valve inherently functions to produce a greater pressure difference between conduits 17 and 18 which means that the flow through the centrifugal valve 15 becomes increasingly restricted as the ground speed of the sprayer increases. This results in an increase of fluid pressure at the spraying nozzles 14 and hence an increase in the amount of fluid delivered as a function of the ground speed of the sprayer.

Conversely, a decrease in the ground speed of the sprayer causes a reduction in the centrifugal forces acting upon the weighted valve, hence causing the weighted valve to shift to the left, as viewed in Fig. 2, and thereby reduces the pressure difference between the inlet conduit 17 and the outlet conduit 18 by passing a greater quantity of fluid through the valve. This action in turn reduces the fluid pressure at the spraying nozzles 14 and reduces the amount of spray deposited in proportion to the reduction in ground speed.

It will thus appear from the above description that there is here provided a desirable method and apparatus for spraying, whereby the quantity of spray liquid delivered through the nozzle is varied in response to the ground speed of the sprayer to maintain a substantially constant rate of fluid application per unit of area so that uniform coverage of vegetation being sprayed will be assured. The governor of this invention may be readily applied to any type of sprayer using pressured fluid delivery and such governor may be readily and easily attached to any ground engaging wheel.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a mobile sprayer having a pressured fluid source and a discharge nozzle, the improvements of a valve connected in fluid controlling relationship between said source and said nozzle, said valve comprising an enlarged body portion and two oppositely disposed, coaxial cylindrical projections formed on said body portion, spaced bearing means for respectively journaling said projections for rotation about their common axis, means for rotating said valve in proportion to the ground speed of said sprayer, said body portion having an internal bore extending transversely to said axis of rotation, a weighted valve element slidably mounted in said bore, said valve element being shiftable in one direction along said bore by centrifugal force, each of said projections having a fluid passage therein communicating with said bore, a piston portion on said valve element cooperating with one of said passages to control fluid flow therethrough as a function of the position of said valve element in said bore, and fluid conduit means in said bearing means respectively communicating with said fluid passages and adapted for connection respectively in fluid circuit relationship with said fluid source, said body portion also defining a bleed passage between one of said passages and said bore to subject said valve element to an unbalanced pressure force opposing the centrifugal displacement of said valve element, whereby fluid flow through said valve varies in proportion to ground speed.

2. In a mobile sprayer having a pressured fluid source and a discharge nozzle, the improvements of a valve connected in fluid controlling relationship between said source and said nozzle, said valve comprising an enlarged body portion and two oppositely disposed, coaxial cylindrical projections formed on said body portion, a U-shaped support having aligned journals in the arm portions thereof for respectively journaling said projections for rotation about their common axis, means for rotating said valve in proportion to the ground speed of said sprayer, said body portion having an internal bore extending transversely to said axis of rotation, a weighted valve element slidably mounted in said bore, said valve element being shiftable along said bore by centrifugal force, each of said projections having a fluid passage therein communicating with said bore, a piston portion on said valve element cooperating with one of said passages to control fluid flow therethrough as a function of the position of said valve element in said bore, and fluid conduit means in each arm portion of said U-shaped support respectively communicating with said fluid passages and adapted for connection respectively in fluid circuit relationship with said fluid source, said body portion also defining a bleed passage between one of said passages and said bore to subject said valve element to an unbalanced pressure force opposing the centrifugal displacement of said valve element, whereby fluid flow through said valve varies in proportion to ground speed.

3. In a mobile sprayer having a pressured fluid source and a discharge nozzle, the improvements of a valve connected in fluid controlling relationship between said source and said nozzle, said valve comprising a support, a body portion rotatably journaled on said support, means for rotating said body portion in proportion to the ground speed of the sprayer, said body portion defining an enclosed bore extending transversely to the axis of rotation of said body member, said body portion also having a pair of fluid passages therein respectively communicating with opposite sides of said bore, a weighted valve element slidably mounted in said bore, said valve element being shiftable in one direction along said bore by centrifugal force, a piston portion on said valve element cooperating with one of said passages to control fluid flow therethrough as a function of the position of said valve element in said bore, and fluid conduit means in said support respectively communicating with said fluid passages and adapted for connection respectively in fluid circuit relationship with said fluid source, said body portion also defining a bleed passage between one of said passages and said bore to subject said valve element to an unbalanced pressure force opposing the centrifugal displacement of said valve element, whereby fluid flow through said valve varies in proportion to ground speed.

LOREN E. BARTLING.

References Cited in the file of this patent

UNITED STATES PATENTS

| Number | Name | Date |
| --- | --- | --- |
| 2,243,597 | Elliott | May 27, 1941 |
| 2,529,656 | Hettelsater | Nov. 14, 1950 |